(12) United States Patent
Kim

(10) Patent No.: US 12,056,500 B2
(45) Date of Patent: Aug. 6, 2024

(54) APPARATUS FOR DRIVING EXTERNAL OPERATING SYSTEM AND METHOD THEREFOR

(71) Applicant: Chang Suk Kim, Seoul (KR)

(72) Inventor: Chang Suk Kim, Seoul (KR)

(*) Notice: Subject to any disclaimer, the term of this patent is extended or adjusted under 35 U.S.C. 154(b) by 0 days.

(21) Appl. No.: 17/630,705

(22) PCT Filed: Jul. 28, 2020

(86) PCT No.: PCT/KR2020/009925
§ 371 (c)(1),
(2) Date: Jan. 27, 2022

(87) PCT Pub. No.: WO2021/020859
PCT Pub. Date: Feb. 4, 2021

(65) Prior Publication Data
US 2022/0261256 A1    Aug. 18, 2022

(30) Foreign Application Priority Data
Jul. 29, 2019 (KR) .................. 10-2019-0092028

(51) Int. Cl.
*G06F 9/44* (2018.01)
*G06F 9/4401* (2018.01)
*G06F 21/62* (2013.01)

(52) U.S. Cl.
CPC .......... *G06F 9/4411* (2013.01); *G06F 9/4403* (2013.01); *G06F 21/6209* (2013.01); *G06F 2221/2141* (2013.01)

(58) Field of Classification Search
CPC .. G06F 9/4411; G06F 9/4403; G06F 21/6209; G06F 2221/2141
See application file for complete search history.

(56) References Cited

U.S. PATENT DOCUMENTS 5,854,905 A * 12/1998 Garney ................ G06F 9/4406
                                                         710/104
7,191,328 B2   3/2007 Hobson
(Continued)

FOREIGN PATENT DOCUMENTS

CN     103377063 A     10/2013
CN     104067223 A      9/2014
(Continued)

OTHER PUBLICATIONS

Office Action issued on Feb. 20, 2023, in corresponding Japanese Application No. 2022-506395, 5 pages.
(Continued)

*Primary Examiner* — Zahid Choudhury
(74) *Attorney, Agent, or Firm* — Maier & Maier, PLLC

(57) ABSTRACT

An apparatus for driving an external operating system and a method therefor. An apparatus for driving an external operating system according to an embodiment of the present invention may include: a communication unit which is connected to a computing device through a communication interface to perform data communication; a boot processing unit for determining a boot mode in response to boot setting information of the computing device; and an OS driving unit for driving an operating system file corresponding to the boot mode.

15 Claims, 9 Drawing Sheets

(56) References Cited

U.S. PATENT DOCUMENTS

| | | | | |
|---|---|---|---|---|
| 7,861,117 | B2* | 12/2010 | Coronado | G06F 11/1417 |
| | | | | 714/36 |
| 7,930,531 | B2* | 4/2011 | Chow | G06F 21/568 |
| | | | | 713/2 |
| 8,095,783 | B2* | 1/2012 | Chong | G06F 9/4406 |
| | | | | 713/2 |
| 8,694,694 | B2* | 4/2014 | Fisher | G06F 9/4451 |
| | | | | 710/13 |
| 8,707,017 | B2* | 4/2014 | Hernandez | G06F 11/2289 |
| | | | | 713/1 |
| 11,016,827 | B2* | 5/2021 | Yoo | G06F 9/541 |
| 2004/0236997 | A1* | 11/2004 | Poo | G06F 9/4406 |
| | | | | 714/36 |
| 2007/0101116 | A1* | 5/2007 | Tsuji | G06F 9/4408 |
| | | | | 713/1 |
| 2007/0180328 | A1* | 8/2007 | Cornwell | G11C 29/56 |
| | | | | 714/E11.038 |
| 2010/0037206 | A1* | 2/2010 | Larimore | G06F 9/455 |
| | | | | 718/1 |
| 2012/0054372 | A1* | 3/2012 | Chen | G06F 9/4411 |
| | | | | 710/13 |
| 2012/0331279 | A1 | 12/2012 | Matsubara | |
| 2013/0138941 | A1 | 5/2013 | Park et al. | |
| 2014/0075172 | A1* | 3/2014 | Knichel | G06F 9/4401 |
| | | | | 713/2 |
| 2014/0325201 | A1* | 10/2014 | Nam | G06F 8/65 |
| | | | | 713/2 |
| 2015/0347152 | A1* | 12/2015 | Pinder | G06F 21/575 |
| | | | | 713/2 |
| 2016/0140055 | A1* | 5/2016 | Sauks | G06F 21/53 |
| | | | | 713/193 |
| 2016/0188345 | A1 | 6/2016 | Chen et al. | |
| 2016/0381202 | A1* | 12/2016 | Koo | G06F 1/1632 |
| | | | | 455/559 |
| 2021/0303334 | A1* | 9/2021 | Hayes | G06F 11/0751 |

FOREIGN PATENT DOCUMENTS

| | | |
|---|---|---|
| CN | 107506216 A | 12/2017 |
| CN | 108614718 A | 10/2018 |
| JP | 2009301504 A | 12/2009 |
| JP | 2002-082810 A | 3/2020 |
| KR | 10-0430468 B1 | 5/2004 |
| KR | 10-2006-0131296 A | 12/2006 |
| KR | 10-1805627 B1 | 12/2017 |
| KR | 10-2103593 B1 | 4/2020 |
| WO | 2008059583 A1 | 5/2008 |

OTHER PUBLICATIONS

Office Action issued on May 6, 2023, in corresponding Chinese Application No. 202080054440.9, 18 pages.

International Search Report mailed Oct. 15, 2020, in corresponding to International Application No. PCT/KR2020/009925; 6 pages (with English Translation).

* cited by examiner

APPARATUS FOR DRIVING EXTERNAL OPERATING SYSTEM AND METHOD THEREFOR

TECHNICAL FIELD

The present disclosure relates to an apparatus for driving an external operating system and a method therefor.

BACKGROUND

The content described in this section merely provides background information on embodiments of the present invention and does not constitute the prior art.

In general, when an operating system (e.g., Windows) is installed on the computer's local hard disk, a boot partition suitable for the hardware installation environment is constructed and installed. However, the boot partition constructed in this form cannot function properly if the hardware environment applied at the time of installation changes even a little. For example, when replacing the hardware due to a malfunction of the computer in use, unless it is in the same environment as the existing hardware, it cannot function properly, and the operating system must be reinstalled.

In general, there are applications (e.g., rufus, WinToUSB, etc.) that can install a portable operating system (e.g., Windows in Windows To Go format) on a portable storage device. However, the preparation and the method for installation are not easy, and although it supports the partial boot environment, it does not satisfy all boot environments. Therefore, there is a need for an apparatus for driving an external operating system including a boot partition that can be driven in any environment.

SUMMARY

A main purpose of the present disclosure is to provide an apparatus and a method for driving the external operating system by determining a boot mode in response to boot setting information of a computing device and driving an operating system according to the determined boot mode.

According to one aspect of the present disclosure, an apparatus for driving an external operating system for achieving the above purpose includes: a communication unit configured to perform data communication by connecting with a computing device through a communication interface; a boot processing unit configured to determine a boot mode in response to boot setting information of the computing device; and an OS driving unit configured to drive an operating system file corresponding to the boot mode.

Further, according to another aspect of the present disclosure, a method for driving the external operating system for achieving the above purpose includes a communication connection step of performing data communication by connecting with a computing device through a communication interface; a boot processing step of determining a boot mode in response to boot setting information of the computing device; and an OS driving step of driving an operating system file corresponding to the boot mode.

As described above, the present disclosure has the effect of driving the operating system in various boot setting environments of the computing device.

Further, the present disclosure has the effect of driving the operating system in an optimal boot mode by checking the boot settings of the computing device in advance.

Further, the present disclosure has the effect of reducing the probability of occurring an error when installing the operating system by checking the boot setting of the computing device in advance.

DETAILED DESCRIPTION

Hereinafter, preferred embodiments of the present disclosure will be described in detail with reference to the accompanying drawings. In explaining the present disclosure, if it is determined that a detailed description of a related publicly known configuration or function may obscure the gist of the present invention, the detailed description thereof will be omitted. Further, preferred embodiments of the present invention will be described below, but the technical idea of the present disclosure is not limited or limited thereto and may be variously implemented by those skilled in the art. Hereinafter, an apparatus and a method for driving an external operating system proposed by the present disclosure will be described in detail with reference to the drawings.

Figure 1:
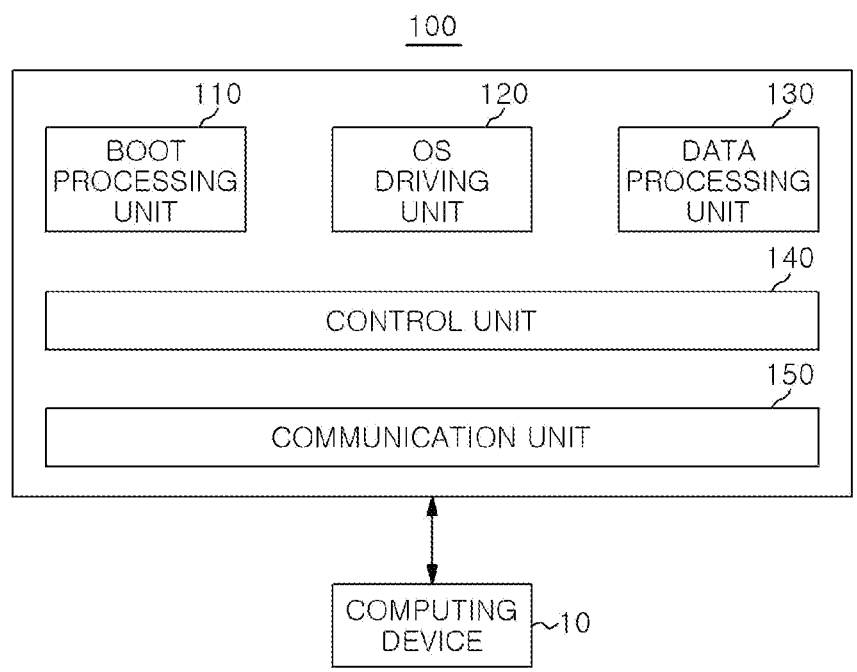
FIG. 1 is a block diagram schematically illustrating an apparatus for driving an external operating system according to an embodiment of the present disclosure.

FIG. 1 is a block diagram schematically illustrating the apparatus for driving the external operating system according to the embodiment of the present disclosure.

The apparatus for driving the external operating system 100 according to the embodiment of the present disclosure may be an apparatus connected with a computing device 10 to provide an operating system service to an external computing device, and include a boot processing unit 110, an OS driving unit 120, a data processing unit 130, a control unit 140, and a communication unit 150. The apparatus for driving the external operating system 100 of FIG. 1 is according to an embodiment, and not all blocks shown in FIG. 1 are essential components. In another embodiment, some blocks included in the apparatus for driving the external operating system 100 may be added, changed or deleted. For example, the apparatus for driving the external operating system 100 may include the boot processing unit 110, the OS driving unit 120, the data processing unit 130, and the communication unit 150, and a module performing the function of the control unit 140 may be included in the computing device 10.

The apparatus for driving the external operating system 100 may refer to an apparatus connected with the external computing device 10 to drive the operating system. Here, the apparatus for driving the external operating system 100 may perform booting into an operating system in a state that a user environment is set, an operating system in an initialized state, and the like.

The computing device 10 according to the present embodiment may refer to a terminal that is connected to the apparatus for driving the external operating system 100 through a communication interface and can transmit and receive various data. The computing device 10 may be one of Tablet PC, Laptop, PC (Personal Computer), Smart Phone, PDA (Personal Digital Assistant), Wireless Terminal, etc. That is, the computing device 10 may be a terminal capable of using the operating system initialized or booted in the apparatus for driving the external operating system 100 through the communication interface, and may refer to a terminal having a memory for storing programs and protocols interworking with the operating system, and a microprocessor for executing and controlling various programs.

The boot processing unit 110 may determine a boot mode in response to the boot setting information of the computing device 10. Here, the boot setting information of the computing device 10 is preferably information obtained from the control unit 140, but it is not limited thereto. For example, if the function of the control unit 140 is performed by the computing device 10, the boot processing unit 110 may obtain the boot setting information from the computing device 10 through the communication unit 150.

The boot processing unit 110 may determine the boot mode by using boot setting information including cable connection setting information, boot mode setting information, disk initialization setting information, and the like. Specifically, the boot processing unit 110 may select each of the first condition information corresponding to the cable connection setting information, the second condition information corresponding to the boot mode setting information, and the third condition information corresponding to the disk initialization setting information, and may determine the boot mode by combining the first condition information, the second condition information and the third condition information. Here, the first condition information may be one cable connection setting method from an IDE (Integrated Development Environment) and an AHCI (Advanced Host Controller Interface), and the second condition information may be one boot mode setting method from a LAGACY and a UEFI (Unified Extensible Firmware Interface). Further, the third condition information may be one disk initialization setting method from a Master Boot Record (MBR) and a GUID Partition Table (GPT).

The boot processing unit 110 may sequentially check the cable connection setting information, the boot mode setting information, and the disk initialization setting information of the computing device 10, and then select and combine the first condition information, the second condition information, and the third condition information to determine the boot mode. For example, the boot processing unit 110 may build total six boot mode environments such as IDE-LAGECY-MBR, IDE-UEFI-MBR, IDE-UEFI-GPT, AHCI-LAGECY-MBR, AHCI-UEFI-MBR, AHCI-UEFI-GPT, etc.

A general booting device cannot perform a booting operation under conditions of a different combination from that of a connected computing device, but the apparatus for driving the external operating system 100 according to the present embodiment may provide the boot processing unit 110 that meets all boot settings separately from the OS driving unit 120 to provide booting services in various environments.

Meanwhile, if one of the cable connection setting information, boot mode setting information and disk initialization setting information of the computing device 10 is not recognized, the boot processing unit 110 may determine the boot mode according to the user's input signal through the computing device 10.

Meanwhile, if the boot setting information for the cable connection setting information, the boot mode setting information and the disk initialization setting information of the computing device 10 are not recognized, the boot processing unit 110 may transmit the boot setting control signal for changing the booting settings of the computing device 10 to the computing device 10. The boot setting control signal may include change information for changing the cable connection setting, the boot mode setting, the disk initialization setting, etc. in order to determine the boot mode in the boot processing unit 110.

The computing device 10 may change the cable connection setting, the boot mode setting, the disk initialization setting, etc. based on the received boot setting control signal, and may provide the changed boot setting change information to the boot processing unit 110. That is, the computing device 10 may initialize the cable connection setting, the boot mode setting, the disk initialization setting, etc. previously set by the received boot setting control signal, and may change the boot setting with setting information included in the boot setting control signal. Here, in the process of changing the boot setting of the computing device 10, an authentication process for security and user authentication may be additionally performed.

The boot processing unit 110 may determine the booting mode based on the changed boot setting change information. Here, the boot processing unit 110 may generate the booting mode in advance when transmitting the boot setting control signal to the computing device 10. If the boot setting change information received from the computing device 10 is identical to the setting information included in the boot setting control signal, the pre-generated boot mode may be determined to run the operating system file.

The boot processing unit 110 may cause the operating system file to be driven in the OS driving unit 120 according to the determined boot mode. The boot processing unit 110 according to the present embodiment describes that the operation of determining the boot mode by checking the boot setting information of the computing device 10 is performed by itself, but it is not necessarily limited thereto. The boot processing unit 110 may be implemented as a boot partition including a boot mode setting file for determining the boot mode. For example, the apparatus for driving the external operating system 100 may have the disk initialized as MBR, have the boot partition formatted as FAT32, have it activated for LAGECY boot, and may set EF properties for UEFI boot. The main files included in the boot processing unit 110 may be a multi-boot file and an initialization boot file. The multi-boot file may be a BCD file including a multi-boot menu for Windows initialization, and may consist of two BCD files responsible for booting LAGECY and UEFI. Further, the initialization boot file may be a file including a setting file constituting the interface at the time of initialization booting of Windows, and may be implemented as a WINPE image file.

The OS driving unit 120 may drive the operating system file corresponding to the boot mode determined by the boot processing unit 110.

The OS driving unit 120 may drive the operating system file corresponding to the boot mode according to whether an operating system initialization request is input to the computing device 10 according to the user's manipulation.

Upon requesting the initialization of the operating system, the OS driving unit 120 may drive the master file including the syspreped operating system image and the first virtual operating system file in the initialization state according to the boot mode. Meanwhile, when the operating system initialization is not requested, the OS driving unit 120 may drive the second virtual operating system file in a state that the user environment is set according to the boot mode.

The OS driving unit 120 may include the operating system file in the form of a virtual hard disk (VHD) in order to minimize the time required to initialize the operating system. For example, the partition of the OS driving unit 120 may be formatted as NTFS and may include a VHD file required for Windows operation.

The master file including the syspreped operating system image included in the operating system file, the first virtual operating system file in the initialized state, and the second virtual operating system file in the state that the user environment is set may be in the forms of VHD files.

The master file of the OS driving unit 120 may be a VHD file corresponding to a parent node, and may include an operating system image that has been syspreped for clean installation of the operating system. Here, for unmanned installation, the response file including the product key is applied to the master file, and this response file may be deleted when operating Windows in order to prevent product key leakage. Further, the master file may include a one-click executable file to initialize the operating system. Here, the one-click executable file may refer to an executable file for operating system initialization based on the first virtual operating system file after booting into the second virtual operating system file in the state that the user environment is set in the existing operating system installed in the computing device 10 or in the apparatus for driving the external operating system 100.

The first virtual operating system file of the OS driver 120 may be a file for driving the operating system in the state that the user environment is set, and the second virtual operating system file may refer to a file for driving the operating system in the initial state for initializing the operating system. Here, the first virtual operating system file and the second virtual operating system file may be VHD files corresponding to child nodes of the master file.

Further, the OS driving unit 120 may restrict the user's access to the operating system file in order to maintain the state of the operating system file.

Specifically, the OS driving unit 120 may restrict the user's access by adding an OEM attribute to the partition including the operating system file so that it is set to be hidden.

Additionally, the OS driving unit 120 may set to hide the master file including the syspreped operating system image included in the operating system file, the first virtual operating system file in the initialization state, and the second virtual operating system file in the state that the user environment is set. Thus, even if the hide setting according to the OEM attribute is released, the user's access can be restricted.

Further, even if the hide setting of the master file including the syspreped operating system image included in the operating system file, the first virtual operating system file in the initialized state, and the second virtual operating system file in the state in which the user environment is set is released, the OS driving unit 120 may set a permission authentication process in order to restrict the user's access to the master file, the first virtual operating system file, and the second virtual operating system file. Here, various authentication methods can be applied to the permission authentication process to restrict access according to the user's authority.

Although it is described that the OS driving unit 120 according to the present embodiment performs the driving operation of the operating system file by itself, it is not necessarily limited thereto. The OS driving unit 120 may be implemented as an OS partition including the operating system file.

The data processing unit 130 may store and manage data that operates in conjunction with the computing device 10 after the operating system file is driven and booting of the operating system is completed.

The data processing unit 130 may be implemented as a data partition, and the data processing unit 130 may be recognized in both the existing operating system installed in the computing device 10 and the virtual operating system file booted from the apparatus for driving the external operating system 100. The data processing unit 130 may perform a function of a portable storage medium.

The control unit 140 may control overall operations related to the operating system in conjunction with the computing device 10.

The controller 140 may transmit a request signal to the computing device 10 and determine the boot mode by obtaining boot setting information corresponding to the request signal.

If the apparatus for driving the external operating system 100 is connected with the computing device 10, the control unit 140 may recognize the existing boot setting information set in the computing device 10. Specifically, the control unit 140 may transmit a request signal to the computing device 10 and recognize the existing boot setting information using a response signal to the request signal.

The control unit 140 according to the present embodiment is described as controlling the overall operation of the apparatus for driving the external operating system 100, but it is not necessarily limited thereto. It may also be implemented as a boot setting confirmation unit that recognizes only the boot setting information of the computing device 10.

On the other hand, the control unit 140 according to the present embodiment is described as being provided in the apparatus for driving the external operating system 100, but it is not necessarily limited thereto. The rest of the control functions except for the function to recognize the boot setting may be implemented in the computing device 10.

The communication unit 150 may perform an operation of performing data communication by connecting with the computing device 10 through a communication interface.

The communication unit 150 is preferably connected with the computing device 10 through a USB cable-based communication interface, but it is not necessarily limited thereto. Various types of communication interfaces such as a SATA cable may be used.

Figure 2:
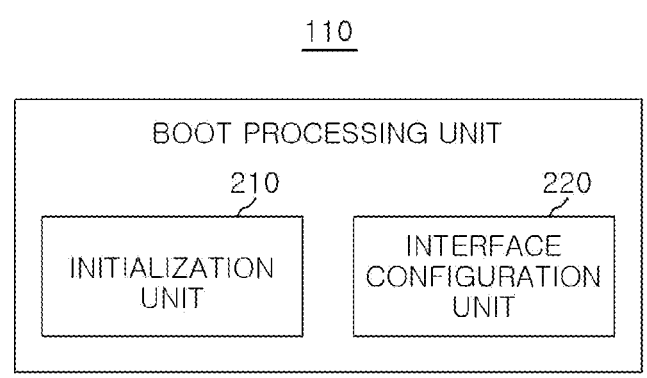
FIG. 2 is a block diagram illustrating a boot processing unit of the apparatus for driving the external operating system according to the embodiment of the present disclosure.

FIG. 2 is a block diagram illustrating the boot processing unit of the apparatus for driving the external operating system according to the embodiment of the present disclosure.

The boot processing unit 110 according to the present embodiment may include an initialization unit 210 and an interface configuration unit 220.

The initialization unit 210 may perform disk initialization and formatting to configure a boot partition. Here, the initialization unit 210 may perform disk initialization and formatting in response to boot setting information of the computing device 10.

The initialization unit 210 may perform disk initialization and formatting by using boot configuration information including cable connection configuration information, boot mode configuration information, and disk initialization configuration information of the computing device 10. For example, the initialization unit 210 may initialize a disk in an MBR format that can support LAGECY and UEFI. Here, since only UEFI booting may be supported for GPT disks, the initialization unit 210 may initialize disks in MBR format that supports both LAGECY and UEFI. Then, the initialization unit 210 may perform formatting to FAT32 that can support LAGECY and UEFI. The initialization unit 210 may format it to FAT32 so that it can be recognized as a boot partition on the UEFI system.

The interface configuration unit 220 may configure a file necessary for booting in response to boot setting information of the computing device 10 and may configure a boot mode according to an interface connection method.

For example, the interface configuration unit 220 may configure two BCD files in response to LAGECY and UEFI systems, respectively. Here, the two BCD files may mean a BCD file for UEFI used in the UEFI system and a BCD file for LAGECY used in the LAGECY system, respectively.

The interface configuration unit 220 may configure a Windows PE image for booting when Windows is reinstalled. The boot partition constructed in this way can be configured as a boot mode that can integrate all installation environments when installing the operating system.

Further, the interface configuration unit 220 may configure a boot mode including all drivers for each SATA mode (IDE, AHCI) in order to respond to SATA mode (IDE, AHCI) conversion. Here, the drivers may vary depending on the type of the operating system.

Figure 3:
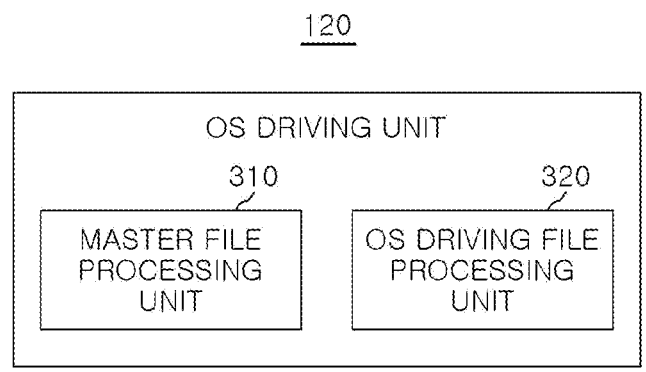
FIG. 3 is a block diagram illustrating an OS driving unit of the apparatus for driving the external operating system according to the embodiment of the present disclosure.

FIG. 3 is a block diagram illustrating the OS driving unit of the apparatus for driving the external operating system according to the embodiment of the present disclosure.

The OS driving unit 120 according to the present embodiment may include a master file processing unit 310 and an OS driving file processing unit 320.

The master file processing unit 310 may process a master file that is a VHD file corresponding to a parent node. Here, the master file may include an operating system image that has been syspreped for a clean installation of the operating system.

The master file processing unit 310 may configure the master file to which the response file including the product key is applied for unmanned installation, and the response file may be deleted when running Windows to prevent product key leakage.

The master file processing unit 310 may include a one-click executable file. If the one-click execution file is executed according to a user's manipulation or input, the master file processing unit 310 may drive the first virtual operating system file or the second virtual operating system file configured in the OS driving file processing unit 320.

The OS driving file processing unit 320 may configure a first virtual operating system file for driving an operating system in an initial state for initializing the operating system and a second virtual operating system file for driving an operating system in a state that a user environment is set. Here, the first virtual operating system file and the second virtual operating system file may be VHD files corresponding to child nodes of the master file.

The OS driving file processing unit 320 may boot the second virtual operating system file in the state that the user environment is set according to the execution of the one-click execution file, or may drive the first virtual operating system file to initialize the operating system.

The OS driving unit 120 of the apparatus for driving the external operating system 100 may reinstall the operating system in the following order. Here, it is assumed that the operating system is a Windows environment, and information on boot settings, etc. is according to one embodiment and may be changed in another embodiment.

The Windows reinstallation process of the apparatus for driving the external operating system 100 may be performed in Windows PE (Windows Preinstallation Environment) mode. During the reinstallation process, the modified Windows PE image file that reflects a selection and an execution may be placed in the boot partition and registered as a multi-boot menu in the BCD file. It is possible to enter the Windows reinstallation mode by calling the GUID alias created when registering the multi-boot menu.

The apparatus for driving the external operating system 100 may enter the Windows reinstallation mode in two ways. The first method is to select Windows initialization with the arrow keys in the multi-boot menu during booting, and the second method is to double-click the one-click Windows initialization shortcut included in the master file while booting into Windows.

Thereafter, the apparatus for driving the external operating system 100 may use a VHD file copy method as a Windows reinstallation method for quick reinstallation. That is, the apparatus for driving the external operating system 100 may overwrite the second virtual operating system file driven by the Windows in which the user environment is configured with the first virtual operating system file to configure a Windows reinstallation environment.

Figure 4:
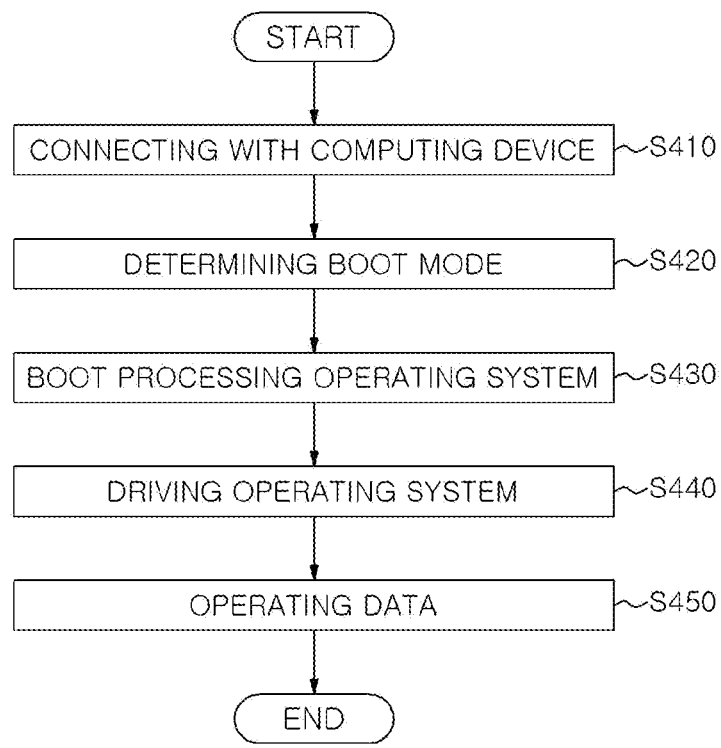
FIG. 4 is a flowchart illustrating a method for driving the external operating system according to the embodiment of the present invention.

FIG. 4 is a flowchart illustrating a method for driving the external operating system according to the embodiment of the present invention.

The apparatus for driving the external operating system 100 may be connected with the computing device 10 through a communication interface (S410).

The apparatus for driving the external operating system 100 may determine a boot mode in response to boot setting information of the computing device 10 (S420). The apparatus for driving the external operating system 100 may determine a boot mode by using boot setting information including cable connection setting information, boot mode setting information, disk initialization setting information, and the like. Specifically, the apparatus for driving the external operating system 100 may select each of the first condition information corresponding to the cable connection setting information, the second condition information corresponding to the boot mode setting information, and the third condition information corresponding to the disk initialization setting information, and may determine the boot mode by combining the first condition information, the second condition information, and the third condition information. Here, the first condition information may be one cable connection setting method from an IDE (Integrated Development Environment) and an AHCI (Advanced Host Controller Interface), and the second condition information may be one boot mode setting method from a LAGACY and a UEFI (Unified Extensible Firmware Interface). Further, the third condition information may be one disk initialization setting method from a Master Boot Record (MBR) and a GUID Partition Table (GPT).

The apparatus for driving the external operating system 100 may configure an operating system file corresponding to the boot mode and may drive the operating system file (S430, S440). The apparatus for driving the external operating system 100 may boot the second virtual operating system file in the state that the user environment is set according to the execution of the one-click execution file, or drive the first virtual operating system file to initialize the operating system.

The apparatus for driving the external operating system 100 may store and manage data that operates in conjunction with the computing device 10 after the operating system file is driven and booting of the operating system is completed (S450).

Although it is described that each step is sequentially executed in FIG. 4, the present disclosure is not limited thereto. In other words, FIG. 4 is not limited to a time-series sequence, since it may be applicable by changing the steps described in FIG. 4 or executing one or more steps in parallel.

The method for driving the external operating system according to the present embodiment described in FIG. 4 may be implemented as an application (or program) and recorded in a recording medium readable by a terminal device (or computer). The recording medium in which an application (or program) for implementing the method of driving the external operating system according to the present embodiment is recorded and a terminal device (or computer) can read is any type of recording device or medium in which data that can be read by the computing system is stored.

Figure 5A:
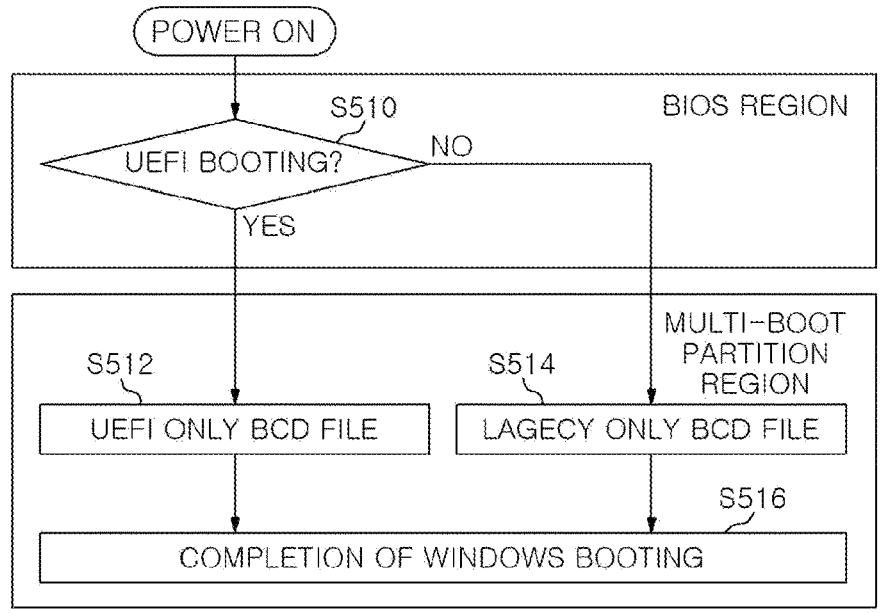
FIGS. 5A to 5C are flowcharts for explaining a booting operation of the operating system according to the embodiment of the present invention.
Figure 5B:
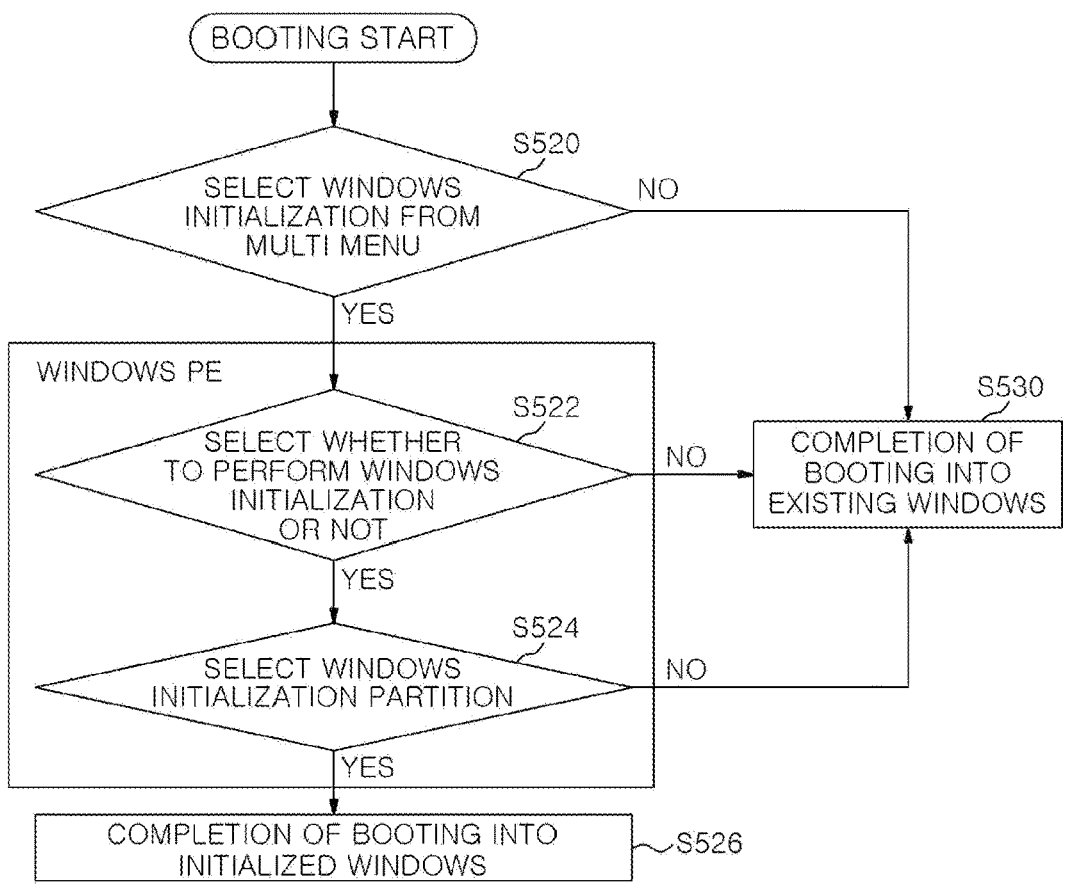
Figure 5C:
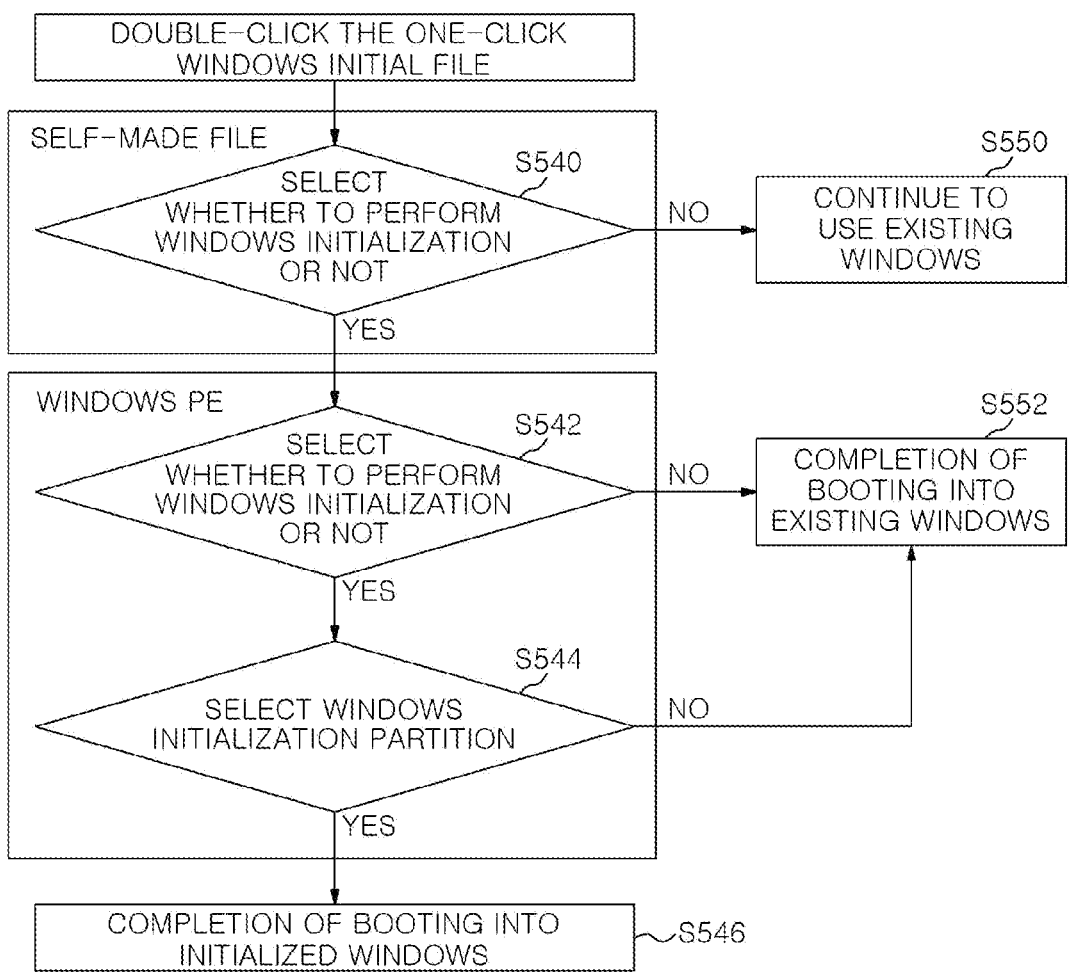

FIGS. 5A to 5C are flowcharts for explaining the booting operation of the operating system according to the embodiment of the present invention.

In FIGS. 5A to 5C, it is assumed that the operating system is a Windows environment, and information on boot settings, etc. is according to one embodiment and may be changed in another embodiment.

Referring to FIG. 5A, the apparatus for driving the external operating system 100 may check whether the computing device 10 is capable of UEFI booting (S510), and if the UEFI booting is possible, the Windows booting is performed (S516) using a UEFI-only BCD file (S512).

On the other hand, when the UEFI booting is impossible in step S510, the apparatus for driving the external operating system 100 may perform Windows booting (S516) using the LAGACY dedicated BCD file (S514).

Referring to FIG. 5B, the apparatus for driving the external operating system 100 may perform Windows reinstallation operation through the multi-boot menu.

The apparatus for driving the external operating system 100 may check whether the initialization of Windows is selected from the multi-menu output to the computing device 10 (S520).

If the Windows initialization is selected in step S520, the apparatus for driving the external operating system 100 may select whether to execute the Windows initialization in the boot partition (S522), and if the Window initialization partition is selected accordingly (S524), the booting is completed into the initialized Windows by performing the Windows initialization (S526).

Meanwhile, if the Windows initialization is not selected in step S520, the apparatus for driving the external operating system 100 may complete booting into Windows in a state that the user environment is set (S530).

Referring to FIG. 5C, the apparatus for driving the external operating system 100 may perform Windows reinstallation operation through manipulation of a one-click Windows initialization file.

The apparatus for driving the external operating system 100 may select whether to initialize Windows through manipulation of the one-click window initialization file (S540), select whether to execute Windows initialization in the boot partition (S542), and if the Windows initialization partition is selected accordingly (S544), perform Windows initialization to complete booting into the initialized Windows (S546).

Meanwhile, if the Windows initialization is not selected in step S540, the existing Windows booted in the computing device 10 is maintained (S550).

On the other hand, if the Windows initialization is not selected in step S542, the apparatus for driving the external operating system 100 may complete booting into Windows in the state that the user environment is set (S552).

Figure 6:
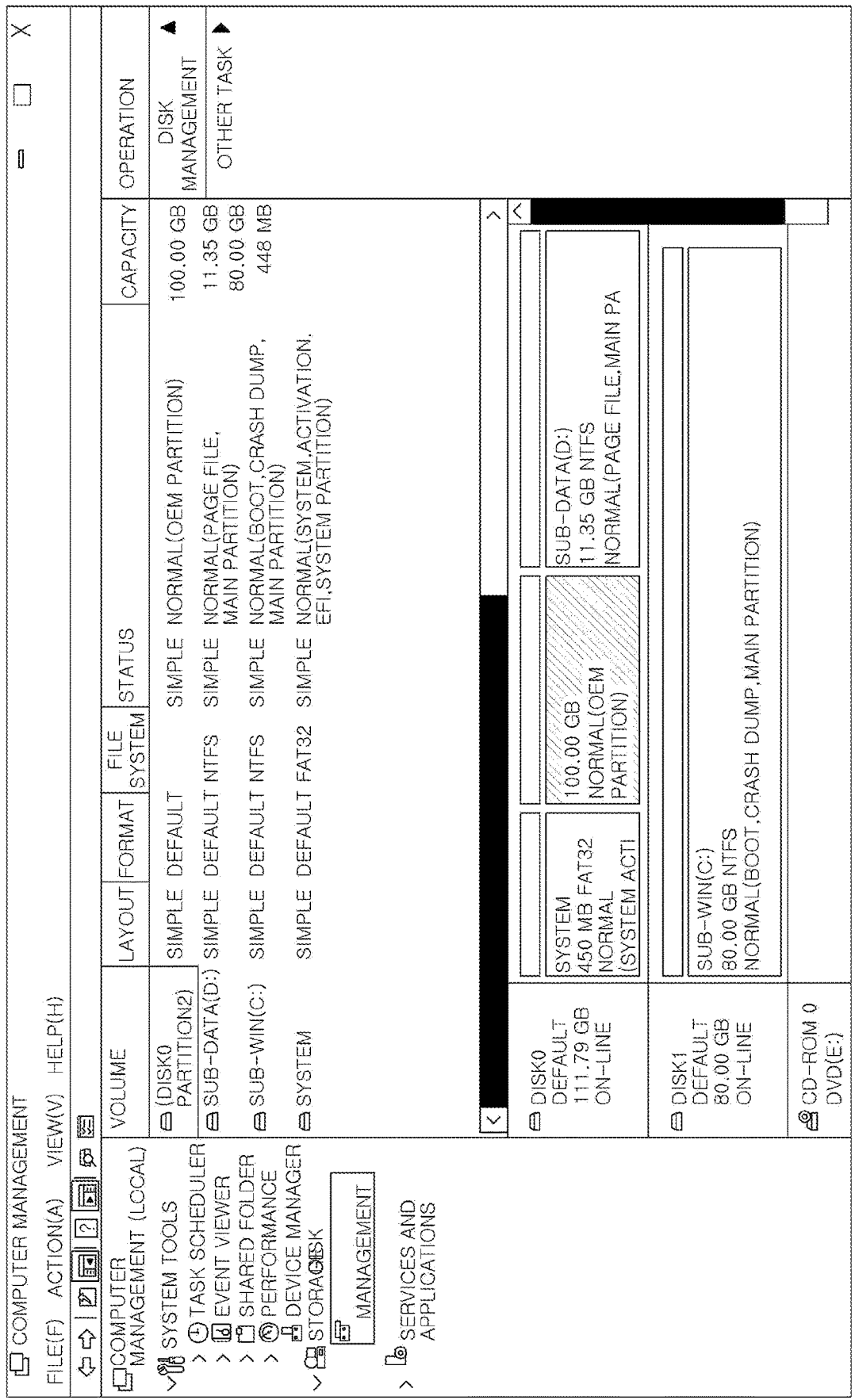
FIG. 6 is an exemplary diagram illustrating partitions divided for driving the external operating system according to the embodiment of the present invention.

FIG. 6 is an exemplary diagram illustrating partitions divided for driving the external operating system according to the embodiment of the present invention.

FIG. 6 shows a screen of the computing device 10 on which the apparatus for driving the external operating system 100 outputs the recognized disk structure state.

As shown in FIG. 6, disk 0 is divided into a boot partition, a Windows driving partition, and a data partition. Here, the boot partition may perform the same function as the boot processing unit 110, and the Windows driving partition may perform the same function as the OS driving unit 120. Further, the data partition may perform the same function as the data processing unit 130.

As shown in FIG. 6, disk 1 represents the Windows partition of the child VHD. Here, disk 1 may include a first virtual operating system file in an initialization state, a second virtual operating system file in a state that a user environment is set, and the like.

FIGS. 7A to 7D are exemplary diagrams illustrating methods for drive setting and using the external operating system according to the embodiment of the present invention. Here, it is assumed that the operating system is the Windows environment, and information on boot settings, etc. is according to one embodiment and may be changed in another embodiment.

Figure 7A:
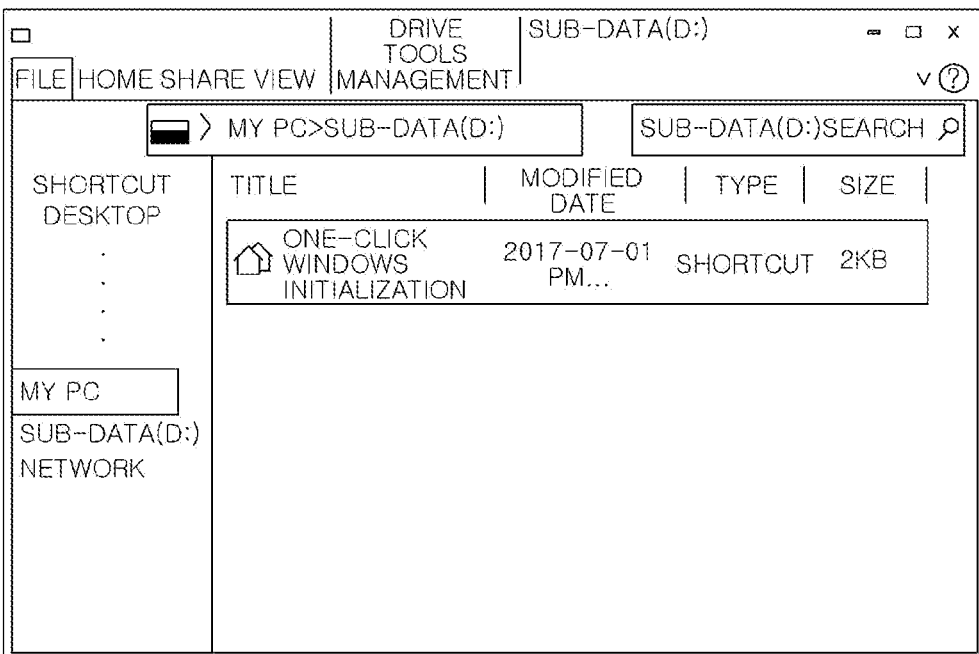
FIG. 7A is an exemplary diagram illustrating a method for drive setting and using the external operating system according to the embodiment of the present invention.

A first screen 710 of FIG. 7A shows a multi-boot menu screen, and a second screen 720 shows a one-click Windows initialization shortcut.

Figure 7B:
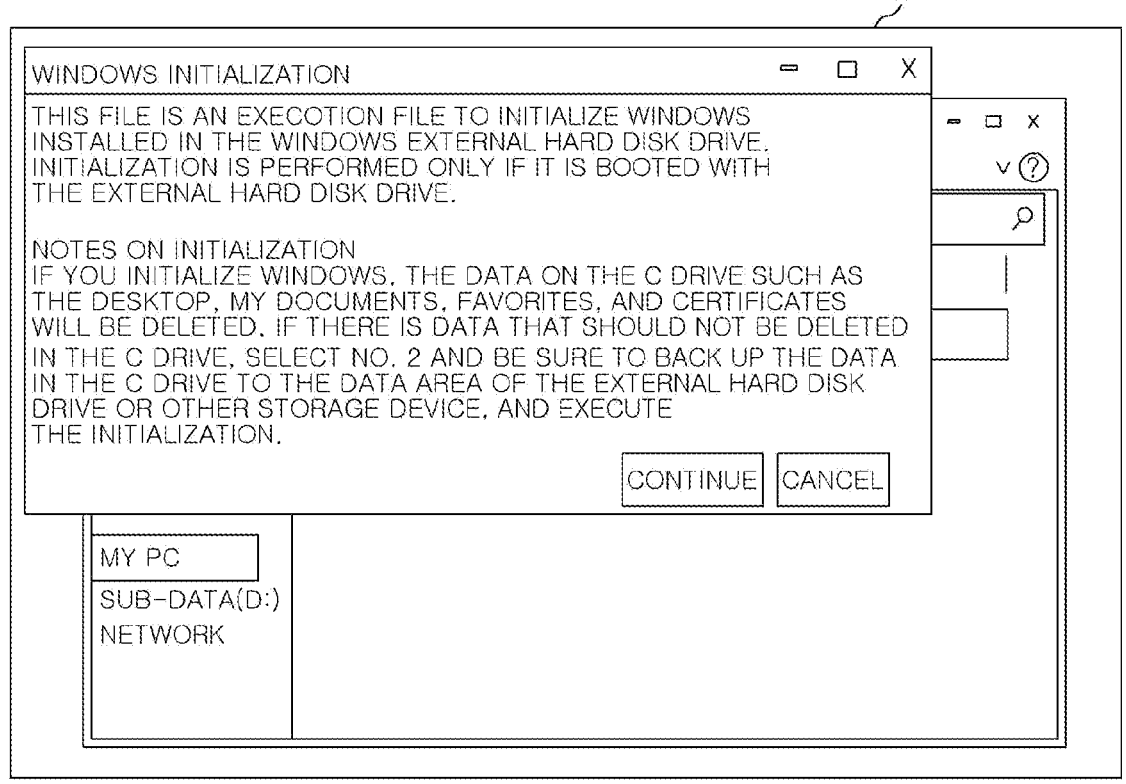
FIG. 7B is an exemplary diagram illustrating a method for drive setting and using the external operating system according to the embodiment of the present invention.
Figure 7B:
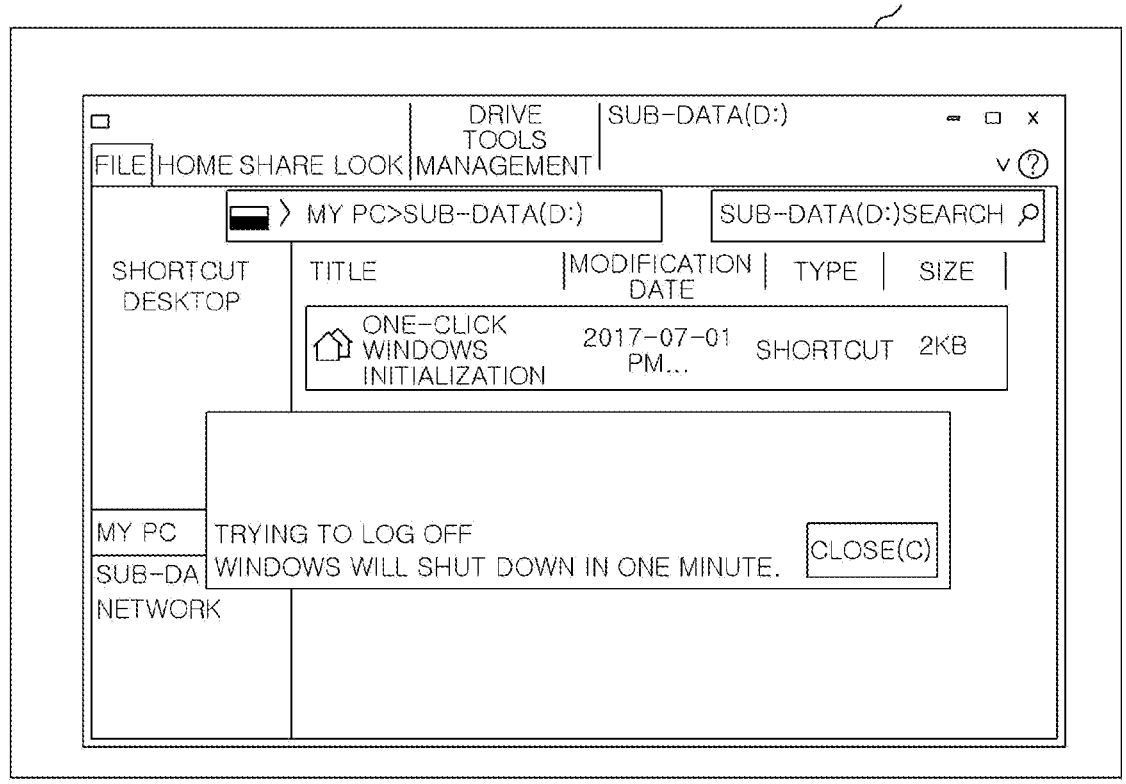

When the one-click Windows initialization shortcut button is clicked, the apparatus for driving the external operating system 100 may execute the one-click Windows initialization file as shown in the third screen 730 of FIG. 7B, and output a one-click Windows initialization execution pop-up window. A fourth screen 740 of FIG. 7B shows a continuous selection screen for executing one-click Windows initialization.

Figure 7C:
FIG. 7C is an exemplary diagram illustrating a method for drive setting and using the external operating system according to the embodiment of the present invention.
Figure 7C:
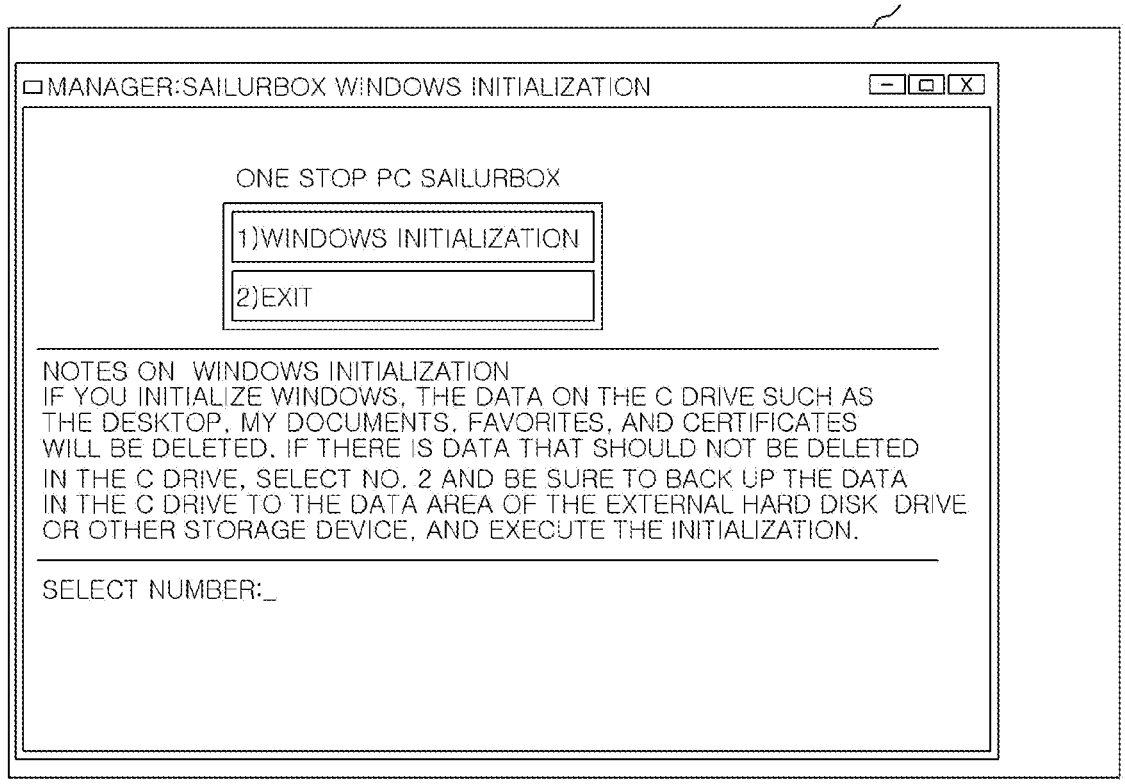
Figure 7D:
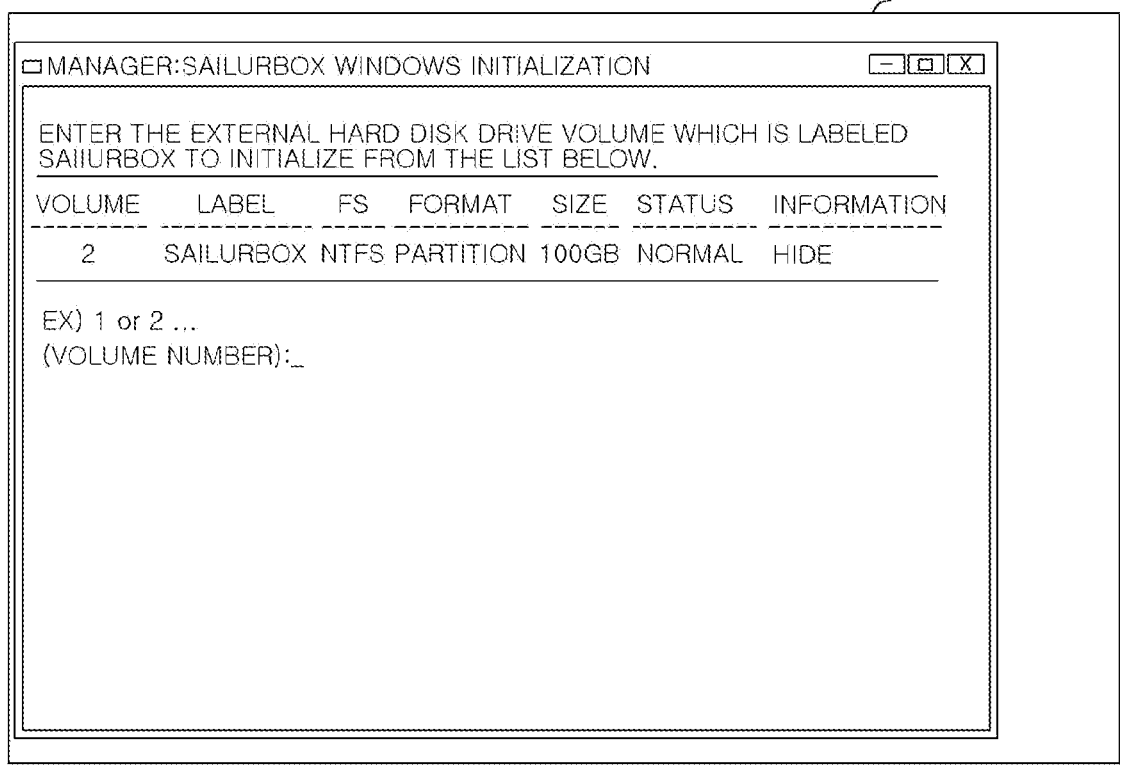
FIG. 7D is an exemplary diagram illustrating a method for drive setting and using the external operating system according to the embodiment of the present invention.
Figure 7D:
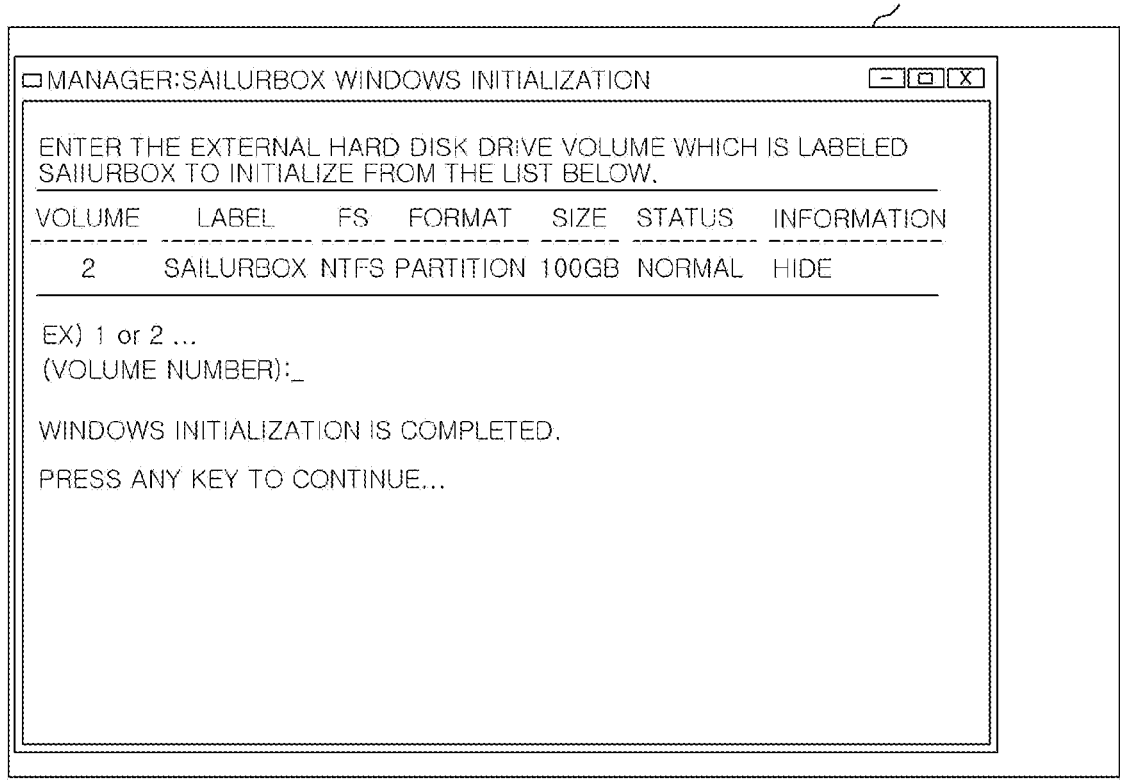

A fifth screen 750 of FIG. 7C shows a restarting screen during one-click Windows initialization execution, and if restarting is completed, a Windows initialization selection screen may be output as shown in the sixth screen 760 of FIG. 7C. Here, when Windows initialization is selected, a screen for selecting a Windows initialization partition is output as shown in the seventh screen 770 of FIG. 7D. Here, if the user selects the Windows initialization partition, the Windows reinstallation environment is configured by overwriting the second virtual operating system file, which was driven by the Windows in which the user environment is configured, with the first virtual operating system file. An eighth screen 780 of FIG. 7D represents a screen on which Windows initialization is completed.

The above description is merely illustrative of the technical idea of the embodiment of the present disclosure, and those skilled in the art in the technical field in which the embodiment of the present disclosure pertains may perform various modifications and transformation. Accordingly, the embodiments of the present disclosure are intended to explain rather than limit the technical idea of the embodiments of the present disclosure, and the scope of the technical idea is not limited by these embodiments. The protection scope of the embodiment of the present disclosure should be construed by the following claims, and all technical ideas within the scope equivalent thereto should be construed as being included in the scope of the embodiment of the present disclosure.

What is claimed is:

1. An apparatus for driving an external operating system, the apparatus comprising:
   a communication unit configured to perform data communication by connecting with a computing device through a communication interface;
   a boot processing unit configured to determine a boot mode in response to boot setting information of the computing device; and
   an OS driving unit configured to drive an operating system file corresponding to the boot mode;
   wherein the boot processing unit is configured to automatically determine the boot mode based on recognition of the boot setting information including at least one of cable connection setting information, boot mode setting information, or disk initialization setting information, wherein the boot processing unit is configured to select the boot mode from a plurality of predetermined boot mode environments, the plurality of predetermined boot mode environments based on the boot setting information;
   wherein the boot processing unit is configured to provide a prompt for manual determination of the boot mode upon failure to recognize the boot setting information; and
   wherein the boot processing unit is configured to determine the boot mode based on each of the cable connection setting information, the boot mode setting information, and the disk initialization setting information, comprising selecting each of a first condition information corresponding to the cable connection setting information, a second condition information corresponding to the boot mode setting information, and a third condition information corresponding to the disk initialization setting information, and determining the boot mode by combining the first condition information, the second condition information, and the third condition information, wherein the first condition information, the second condition information, and the third condition information are selected by sequentially checking the cable connection setting information, the boot mode setting information, and the disk initialization setting information.

2. The apparatus of claim 1, further comprising:
   a control unit configured to transmit a request signal to the computing device and to determine the boot mode by obtaining the boot setting information corresponding to the request signal.

3. The apparatus of claim 1,
   wherein the boot processing unit is configured to determine the boot mode by selecting the first condition information of one of IDE and AHCI, the second condition information of one of LAGECY and UEFI, and the third condition information of one of MBR and GPT.

4. The apparatus of claim 1,
   wherein the boot processing unit is configured to determine the boot mode according to a user input signal through the computing device if one of the cable connection setting information, the boot mode setting information, and the disk initialization setting information is not recognized.

5. The apparatus of claim 1,
   wherein the boot processing unit is configured to transmit a boot setting control signal to the computing device and to determine the boot mode based on boot setting change information of the computing device changed by the boot setting control signal, if one of the cable connection setting information, the boot mode setting information, and the disk initialization setting information is not recognized.

6. The apparatus of claim 1,
   wherein the OS driving unit is configured to drive the operating system file corresponding to the boot mode depending upon whether there is request for an operating system initialization input to the computing device according to a user's manipulation.

7. The apparatus of claim 6,
   wherein the OS driving unit is configured to drive the master file including the sealed operating system image and a first virtual operating system file in the initialization state according to the boot mode when the operating system initialization is requested.

8. The apparatus of claim 6,
   wherein the OS driving unit is configured to drive a second virtual operating system file in a state that a user environment is set according to the boot mode when the operating system initialization is not requested.

9. The apparatus of claim 6,
   wherein the OS driving unit is configured to restrict the user's access to maintain a state of the operating system file.

10. The apparatus of claim 9,
    wherein the OS driving unit is configured to restrict the user's access by adding an OEM attribute to a partition including the operating system file to set the operating system file to be hidden.

11. The apparatus of claim 10,
    wherein the OS driving unit is configured to restrict the user's access by hidden-setting a master file including a sealed operating system image included in the operating system file, a first virtual operating system file in an initialized state, and a second virtual operating system file in a state that a user environment is set.

12. The apparatus of claim 11,
    wherein the OS driving unit is configured to restrict the user's access through a permission authentication process of the master file, the first virtual operating system file, and the second virtual operating system file, even if the hidden-setting of the master file, the first virtual operating system file, and the second virtual operating system file included in the operating system file is released.

13. The apparatus of claim 1, further comprising:
a data processing unit for storing and managing data operated in conjunction with the computing device after the operating system file is driven.

14. A method of driving an operating system in an apparatus for driving an external operating system, the method comprising:
  a communication connection step of performing data communication by connecting with a computing device through a communication interface;
  a boot processing step of determining a boot mode in response to boot setting information of the computing device, comprising:
    automatically retrieving boot setting information comprising at least one of cable connection setting information, boot mode setting information, or disk initialization setting information,
    performing a recognition process on the boot setting information,
    determining that the boot setting information is recognized and proceeding without a manual input prompt; and
    selecting the boot mode from a plurality of predetermined boot mode environments, the plurality of predetermined boot mode environments based on the boot setting information; and
  an OS driving step of driving an operating system file corresponding to the boot mode;
  wherein in the boot processing step, the boot mode is determined based on each of the cable connection setting information, the boot mode setting information, and the disk initialization setting information by selecting each of a first condition information corresponding to the cable connection setting information, a second condition information corresponding to the boot mode setting information, and a third condition information corresponding to the disk initialization setting information, and by combining the first condition information, the second condition information, and the third condition information, wherein the first condition information, the second condition information, and the third condition information are selected by sequentially checking the cable connection setting information, the boot mode setting information, and the disk initialization setting information.

15. A non-transitory computer-readable storage medium including computer executable instructions, wherein the instructions, when executed by a processor, cause the processor to perform a method of driving an operating system, comprising:
  a communication connection step of performing data communication by connecting with a computing device through a communication interface;
  a boot processing step of determining a boot mode in response to boot setting information of the computing device, comprising:
    automatically retrieving boot setting information comprising at least one of cable connection setting information, boot mode setting information, or disk initialization setting information,
    performing a recognition process on the boot setting information,
    determining that the boot setting information is recognized and proceeding without a manual input prompt; and
    selecting the boot mode from a plurality of predetermined boot mode environments, the plurality of predetermined boot mode environments based on the boot setting information; and
  an OS driving step of driving an operating system file corresponding to the boot mode;
  wherein in the boot processing step, the boot mode is determined based on each of the cable connection setting information, the boot mode setting information, and the disk initialization setting information by selecting each of a first condition information corresponding to the cable connection setting information, a second condition information corresponding to the boot mode setting information, and a third condition information corresponding to the disk initialization setting information, and by combining the first condition information, the second condition information, and the third condition information, wherein the first condition information, the second condition information, and the third condition information are selected by sequentially checking the cable connection setting information, the boot mode setting information, and the disk initialization setting information.

\* \* \* \* \*